(12) United States Patent
Cyders et al.

(10) Patent No.: US 9,052,002 B2
(45) Date of Patent: Jun. 9, 2015

(54) CONTINUOUSLY VARIABLE TRANSMISSION HAVING SPEED CONTROL

(75) Inventors: Timothy James Cyders, Athens, OH (US); William Taylor Beale, Athens, OH (US)

(73) Assignee: Beale Innovations, Inc., Athens, OH (US)

( * ) Notice: Subject to any disclaimer, the term of this patent is extended or adjusted under 35 U.S.C. 154(b) by 607 days.

(21) Appl. No.: 13/210,906

(22) Filed: Aug. 16, 2011

(65) Prior Publication Data

US 2012/0036952 A1 Feb. 16, 2012

Related U.S. Application Data

(60) Provisional application No. 61/374,075, filed on Aug. 16, 2010.

(51) Int. Cl.
*F16H 31/00* (2006.01)
*F16H 29/00* (2006.01)
*F16H 29/12* (2006.01)

(52) U.S. Cl.
CPC ........... *F16H 31/001* (2013.01); *Y10T 74/1595* (2015.01); *Y10T 74/1526* (2015.01); *Y10T 74/1544* (2015.01); *Y10T 74/1545* (2015.01); *F16H 29/00* (2013.01); *F16H 29/12* (2013.01)

(58) Field of Classification Search
CPC .......... F16H 29/00; F16H 29/12; F16H 29/14
USPC ............. 74/126, 136, 137; 280/251, 255, 258
See application file for complete search history.

(56) References Cited

U.S. PATENT DOCUMENTS

| 692,626 | A | * | 2/1902 | Clark | 74/137 |
| 4,026,571 | A | * | 5/1977 | Vereyken | 280/251 |
| 5,272,928 | A | * | 12/1993 | Young | 74/137 |
| 6,554,309 | B2 | * | 4/2003 | Thir | 280/253 |
| 7,011,322 | B2 | | 3/2006 | Beale | |
| 2010/0117327 | A1 | * | 5/2010 | Hadley | 280/214 |
| 2010/0244401 | A1 | * | 9/2010 | Hara et al. | 280/261 |

* cited by examiner

*Primary Examiner* — William Kelleher
*Assistant Examiner* — Emily Cheng
(74) *Attorney, Agent, or Firm* — Chernoff, Vilhauer, McClung & Stenzel LLP (57) ABSTRACT

A continuously variable transmission system is provided having an input driving member drivable in alternating motion by a source of input mechanical energy. A ratchet having a ratcheting member and an output driven member is provided, wherein the output driven member is rotationally driven in a continuous rotational direction. A drive spring and a drive linkage are drivingly linked between the input driving member and the ratcheting member, wherein a drive force applied to the input driving member is transmitted to the ratcheting member via the drive spring and drive linkage. A return spring is drivingly linked to the ratcheting member to apply a return force to the ratcheting member. A control apparatus is further configured to selectively vary a deflection curve of the drive spring, wherein the variation in the deflection curve generally determines one or more of a rotational speed and torque associated with the output driven member.

5 Claims, 7 Drawing Sheets

CONTINUOUSLY VARIABLE TRANSMISSION HAVING SPEED CONTROL

REFERENCE TO RELATED APPLICATION

This application claims priority to and the benefit of U.S. Provisional Application Ser. No. 61/374,075 which was filed on Aug. 16, 2010, entitled "SPEED CONTROL ASSOCIATED WITH A CONTINUOUSLY VARIABLE TRANSMISSION", the entirety of which is hereby incorporated by reference as if fully set forth herein.

FIELD

The present invention relates generally to continuously variable transmissions, and more particularly, to a system for controlling an output speed or torque of a continuously variable transmission.

BACKGROUND

A transmission is often provided in a drive train of a vehicle or other machine so that a drive ratio between input and output can be varied over an operating range of a prime mover. Accordingly, the prime mover can be operated over its operating torque and speed range while permitting the output to vary over different and usually considerably broader torque and speed ranges. Manual transmissions were developed to manually select one of several discrete transmission ratios. For example, a derailleur system in a bicycle or a conventionally geared transmission in an automobile implement various sprockets or gears that are alternatively engaged in order to select from a limited number of available gear ratios.

A variety of automatic transmissions have been developed to aid the vehicle or machine operator, wherein the appropriate transmission ratios for given conditions are automatically determined and implemented. For example, a conventional vehicle automatic transmission typically provides an automation of shifting between discrete gear engagements of the transmission using speed or torque sensing devices. Other transmissions use belt and pulley systems which vary the effective pulley diameter. Still other automatic transmissions utilize hydraulic systems comprising hydraulic pumps, motors and various valve arrangements. Such conventional automatic transmission systems are often complicated, heavy, and bulky, and therefore expensive. Further, such systems often shift abruptly in a stepped manner between discrete ratios, rather than in a smooth and continuous manner.

SUMMARY

The present disclosure is generally directed toward a transmission having a progressively varying drive ratio that varies in a smoothly continuous manner in response to variations in load power demand and input power. The transmission of the present disclosure is particularly suitable for a bicycle, therein the transmission allows a rider to pedal at a comfortable pedal speed and torque while the transmission automatically varies the drive ratio in response to load power demand, such as caused by inclined surfaces, without causing substantial variations in the input torque and speed perceived by or required by the rider. Implementation of the transmission of the present disclosure is not limited to use in a bicycle, however, and has utility in various other mechanisms, such as winches, turbines, automobiles, etc.

This summary is not an extensive overview of the invention. It is intended to neither identify key or critical elements of the invention nor delineate the scope of the invention. Its purpose is to present some concepts of the invention in a simplified form as a prelude to the more detailed description that is presented later.

The present disclosure provides a speed control mechanism for effectively controlling a speed of an output drive of the transmission, while maintaining limited input torque variations. A continuously variable transmission system is thus provided, wherein the system comprises an input driving member, wherein the input driving member is drivable in alternating motion by a source of input mechanical energy. The alternating motion can be a linear reciprocal motion, a rotary motion, or any other alternation motion. A ratchet, also called a one-way element, is further provided, wherein the ratchet comprises a ratcheting member and an output driven member, and wherein the ratcheting member is configured to alternate directions of motion and to rotationally drive the output driven member in a continuous rotational direction about a driven axis. The ratchet, for example, comprises a sprag clutch, or any other one-way clutch or ratchet configured to rotate the output driven member in a single, continuous rotational direction, while receiving reciprocating or alternation directional input(s).

In accordance with the disclosure, a drive spring and a drive linkage are further provided, wherein the drive spring and drive linkage are drivingly linked between the input driving member and the ratcheting member. A drive force applied to the input driving member, for example, is transmitted to the ratcheting member via the drive spring and drive linkage. According to one example, a return spring is further drivingly linked to the ratcheting member, wherein the return spring is configured to apply a return force to the ratcheting member, and wherein the return force is in a direction generally opposite to the drive force applied by the drive spring and drive linkage. The return force can alternatively be provided by the drive spring, wherein the return spring can be considered to be integral to one or more of the drive spring and ratchet.

According to the another aspect of the disclosure, the continuously variable transmission system further comprises a control apparatus that is configured to selectively vary a deflection curve associated with the drive spring. Accordingly, the variation in the deflection curve generally determines one or more of a rotational speed and torque associated with the output driven member. In one example, the control apparatus comprises a selectively adjustable member in selective engagement with the drive spring, wherein the selectively adjustable member controls a pre-tension associated with the drive spring, therein selectively varying the deflection curve associated with the drive spring.

In another example, a backup member is generally fixed to the ratcheting member, wherein the drive spring comprises a cantilever spring coupled between the drive linkage and the ratcheting member, and wherein a surface of the backup wall extends along a curved path from near a place of coupling of the cantilever spring to the ratcheting member. Accordingly, the surface of the backup wall generally defines a fulcrum of the cantilever spring based on a rotational position of the ratcheting member.

In one example, the selectively adjustable member comprises a plug member configured to translate between the backup wall and the cantilever spring along the curved path of the backup wall, wherein a point at which the cantilever spring meets the plug member generally defines the fulcrum of the cantilever spring, and wherein the control apparatus is configured to vary a position of the plug member along the curved path of the backup wall, therein controlling the deflection curve associated with the cantilever spring.

In another example, the backup wall comprises a selectively deformable surface, therein defining the selectively adjustable member, wherein the fulcrum of the cantilever spring is generally defined by a point at which the cantilever spring meets the selectively deformable surface. In yet another example, the selectively adjustable member comprises a slide operably coupled to an end of the drive linkage, and wherein the slide is further configured to slidingly engage the cantilever spring and translate along a length of the cantilever spring, wherein the engagement between of the slide along a length of the cantilever spring therein selectively varying an effective length of the cantilever spring, and therein selectively varying the deflection curve associated with the drive spring.

According to another exemplary aspect of the disclosure, the control apparatus comprises a return spring pre-tension apparatus, wherein the return spring pre-tension apparatus controls a pre-tension associated with the return spring, therein selectively varying the deflection curve associated with the drive spring.

In another example of the disclosure, the drive linkage is generally rigidly coupled to the ratcheting member, and wherein the drive force applied to the input driving member is transmitted to the drive linkage via the drive spring, and wherein the control apparatus comprises a selectively adjustable member in selective engagement with the drive spring, wherein the adjustable member controls a pre-tension associated with the drive spring, therein selectively varying the deflection curve associated with the drive spring.

In still another example, the drive spring comprises a coil spring, and wherein the control apparatus further comprises one or more of a motor, a screw, and a cable generally coupled to the selectively adjustable member, wherein the one or more of the motor, screw, and cable is configured vary a compression of the coil spring via the selectively adjustable member.

In a further example, the continuously variable transmission system further comprises a gas source, wherein the drive spring comprises a gas spring, and wherein the selectively adjustable member comprises a pressure regulator operably coupled between the gas source and the gas spring, and wherein the control apparatus is configured to selectively vary a gas pressure within the gas spring via a control of one or more of the pressure regulator and gas source.

The drive linkage, in another example, is generally rigidly coupled to the ratcheting member, and wherein the drive force applied to the input driving member is transmitted to the drive linkage via the drive spring, and wherein the control apparatus comprises a selectively adjustable member in selective engagement with the drive spring, wherein the adjustable member controls a pre-tension associated with the drive spring, therein selectively varying the deflection curve associated with the drive spring.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of a few of the various ways in which the principles of the invention may be employed. Other objects, advantages and novel features of the invention will become apparent from the following detailed description of the invention when considered in conjunction with the drawings.

DETAILED DESCRIPTION

The present invention is directed generally toward continuously variable transmissions (CVTs) and systems and apparatus for controlling a speed or torque of an output thereof. The present disclosure has particular utility when implemented in conjunction with the system and apparatus described in commonly-owned U.S. Pat. No. 7,011,322, entitled "Automatic Transmission with Stepless, Continuously Variable Speed and Torque Ratio", the contents of which are incorporated by reference, in its entirety.

Accordingly, the present invention will now be described with reference to the drawings, wherein like reference numerals may be used to refer to like elements throughout. It should be understood that the description of these aspects are merely illustrative and that they should not be interpreted in a limiting sense. In the following description, for purposes of explanation, numerous specific details are set forth in order to provide a thorough understanding of the present invention. It will be evident to one skilled in the art, however, that the present invention may be practiced without these specific details.

Figure 1:
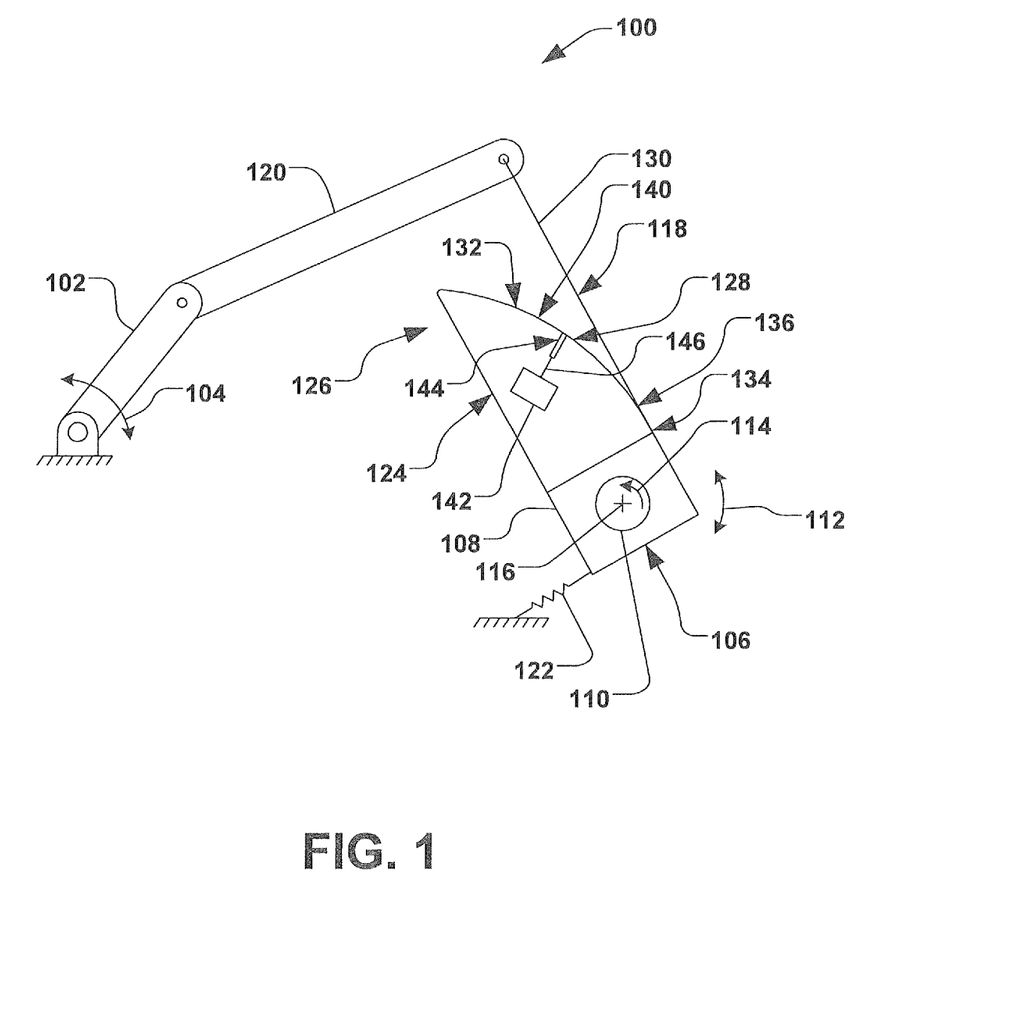
FIG. 1 is a schematic illustrating a continuously variable transmission having an exemplary speed control apparatus in accordance with one aspect of the disclosure.

Referring now to the Figures, FIG. 1 illustrates an exemplary continuously variable transmission 100, wherein several inventive aspects of the present disclosure will now be described. As illustrated in FIG. 1, the exemplary continuously variable transmission system 100 comprises an input driving member 102, wherein the input driving member is drivable in alternating motion (e.g., illustrated by arrow 104) by a source of input mechanical energy (not shown). The input driving member 102, for example, provides alternating motion that is intermittent movement along a path (e.g., movement in one direction and followed by movement in the opposite direction). The path of alternating motion, for example, comprises alternating rotary motion along an arc of a circle, such as that associated with a rotary crank (e.g., a bicycle crank or the like). Alternatively, the path of alternating motion comprises a linear displacement along a line, in the form of reciprocation (e.g., an internal combustion piston or the like). It should be noted, however, that the present invention is not limited to rotary and linear alternating motion, as the alternation motion can occur along various other paths, and all such motions and apparatus capable of making such motions are contemplated as falling within the scope of the present invention.

A ratchet 106 is further provided, wherein the ratchet comprises a ratcheting member 108 and an output driven member 110. The ratcheting member 108, for example, is configured to alternate directions of motion (e.g., illustrated by arrow 112), and to rotationally drive the output driven member 110 in a continuous rotational direction (e.g., illustrated by arrow 114) about a driven axis 116. Continuous rotational motion, for example, comprises motion continuing in the same rotational direction, and not generally reversing rotational direction. It should be noted, however, that the continuous rotational motion can be intermittent in time, such as having intervals of no motion or having different speeds of motion, so long as the direction of motion continues the same. The ratchet 106, for example, comprises a sprag clutch, geared ratchet, or any other mechanism configured to provide one-way motion of the output driven member given an alternating motion input.

In accordance with one exemplary aspect of the invention, a drive spring 118 and a drive linkage 120 are drivingly linked between the input driving member 102 and the ratcheting member 108, wherein a drive force (e.g., associated with the alternating motion 104) applied to the input driving member is transmitted to the ratcheting member via the drive spring and drive linkage. According to one example, a return spring 122 is further drivingly linked to the ratcheting member 108, wherein the return spring is configured to apply a return force to the ratcheting member, wherein the return force is in a direction generally opposite to the drive force applied by the drive spring and drive linkage.

The return spring 122, for example, is grounded with respect to the axis 116. A spring rate of the return spring 122, in one example, is associated with a spring rate of the drive spring 118, as will be discussed infra. It should be noted, however, that the return spring 122 can alternatively be provided by the drive spring 118, and/or the return spring can be considered to be integral to one or more of the drive spring 122 and ratchet 106. Further, the spring rate of the return spring 122 can made to be effectively zero, wherein frictional forces associated with the ratchet 106, or other components within the system 100 can be considered to be equivalents to the return spring 122.

In accordance with another exemplary aspect, a control apparatus 124 is provided, wherein the control apparatus is configured to selectively vary a deflection curve associated with the drive spring 118, wherein the variation in the deflection curve generally determines one or more of a rotational speed and torque associated with the output driven member 110. As such, the control apparatus 124 effectively controls the rotational speed and/or torque of the output driven member 110 by varying the deflection curve of the drive spring 118 for a given input from the input driving member 102.

As illustrated in the continuously variable transmission system 100 of FIG. 1, for example, the control apparatus 124 comprises a selectively adjustable member 126 in selective engagement with the drive spring 118, wherein the selectively adjustable member controls a pre-tension associated with the drive spring. Controlling the pre-tension associated with the drive spring 118, for example, thus selectively varies the deflection curve associated with the drive spring. The exemplary CVT system 100 of FIG. 1, for example, further comprises a backup wall 128 generally fixed to the ratcheting member 108, wherein the drive spring 118 comprises a cantilever spring 130 (e.g., a beam spring) coupled between the drive linkage 120 and the ratcheting member. A surface 132 of the backup wall 128, for example, extends along a curved path from near a place 134 of coupling of the cantilever spring 130 to the ratcheting member 108. The surface 132 of the backup wall 128, for example, generally defines a fulcrum 136 of the cantilever spring 130 based on a rotational position of the ratcheting member 108. For example, the fulcrum 136 is generally defined by the location where the cantilever spring 130 and the backup wall 128 meet.

As illustrated in FIG. 1, according to another exemplary aspect of the invention, the backup wall 128 comprises a selectively deformable surface 140, therein defining the selectively adjustable member 126, wherein the fulcrum 136 of the cantilever spring 130 is generally defined by a point at which the cantilever spring meets the selectively deformable surface. The backup wall 128, for example, comprises a blade of material (e.g., a flexible metal blade) that generally defines the selectively deformable surface 140.

In one example, the control apparatus 124 further comprises a motor 142 generally fixed with respect to the ratcheting member 108, wherein a coupling 144 operably couples an output 146 (e.g., a rotating shaft) of the motor to the backup wall 128. The coupling 144, for example, comprises one or more of a cable and a screw operably coupled to the one or more of the motor 142 and backup wall 128. Accordingly, the motor 142 is configured to selectively deform the surface 132 (e.g., the selectively deformable surface 140) of the backup wall 128 based on a rotation of the output 146 of the motor with respect to the coupling 144. In another example, the control apparatus 124 comprises a cable and/or a screw (not shown) operably coupled to the backup wall 128, wherein the cable and/or screw is/are configured to deform the selectively deformable surface 140 of the backup wall via a force applied to the cable. Accordingly, the pre-tension associated with the drive spring 118 is controlled, thus varying the deflection curve associated with the drive spring and affecting the rotational speed of the output driven member 110.

Figure 4:
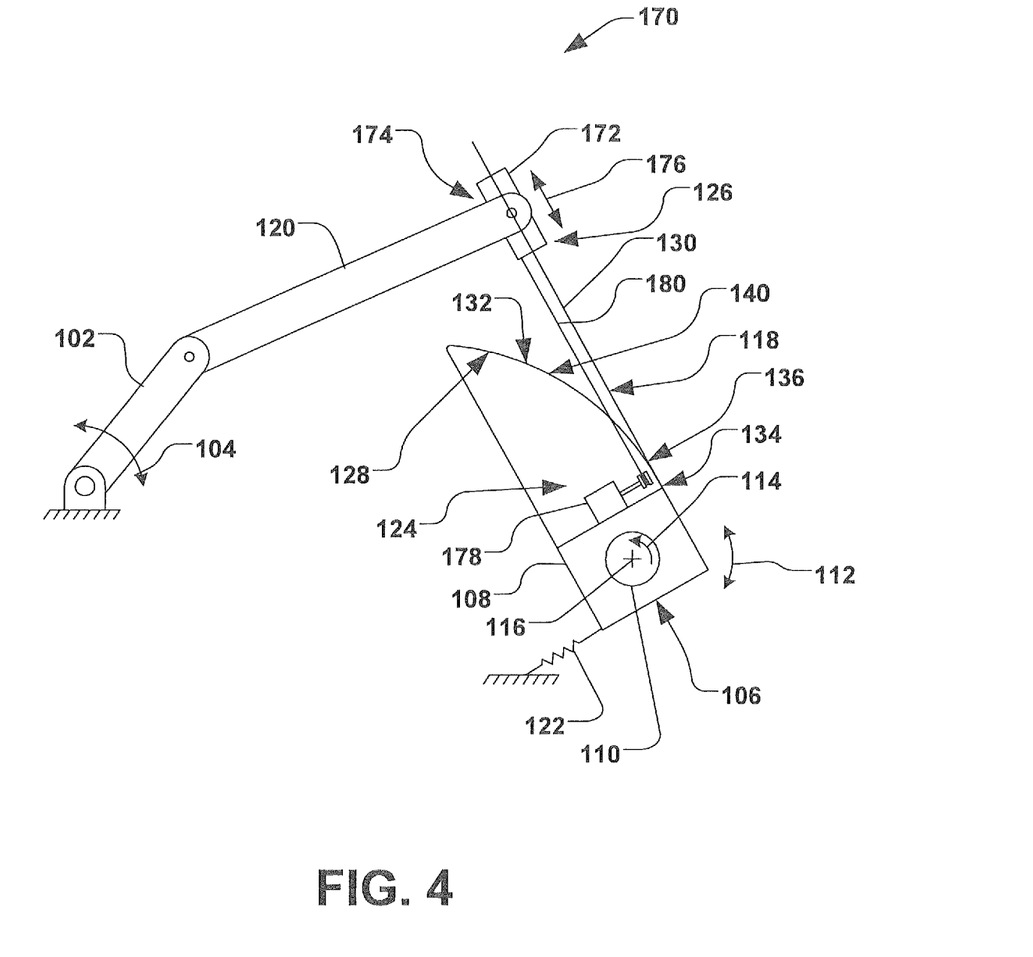
FIG. 4 is a schematic illustrating a continuously variable transmission in accordance with still another exemplary aspect of the disclosure.
Figure 5:
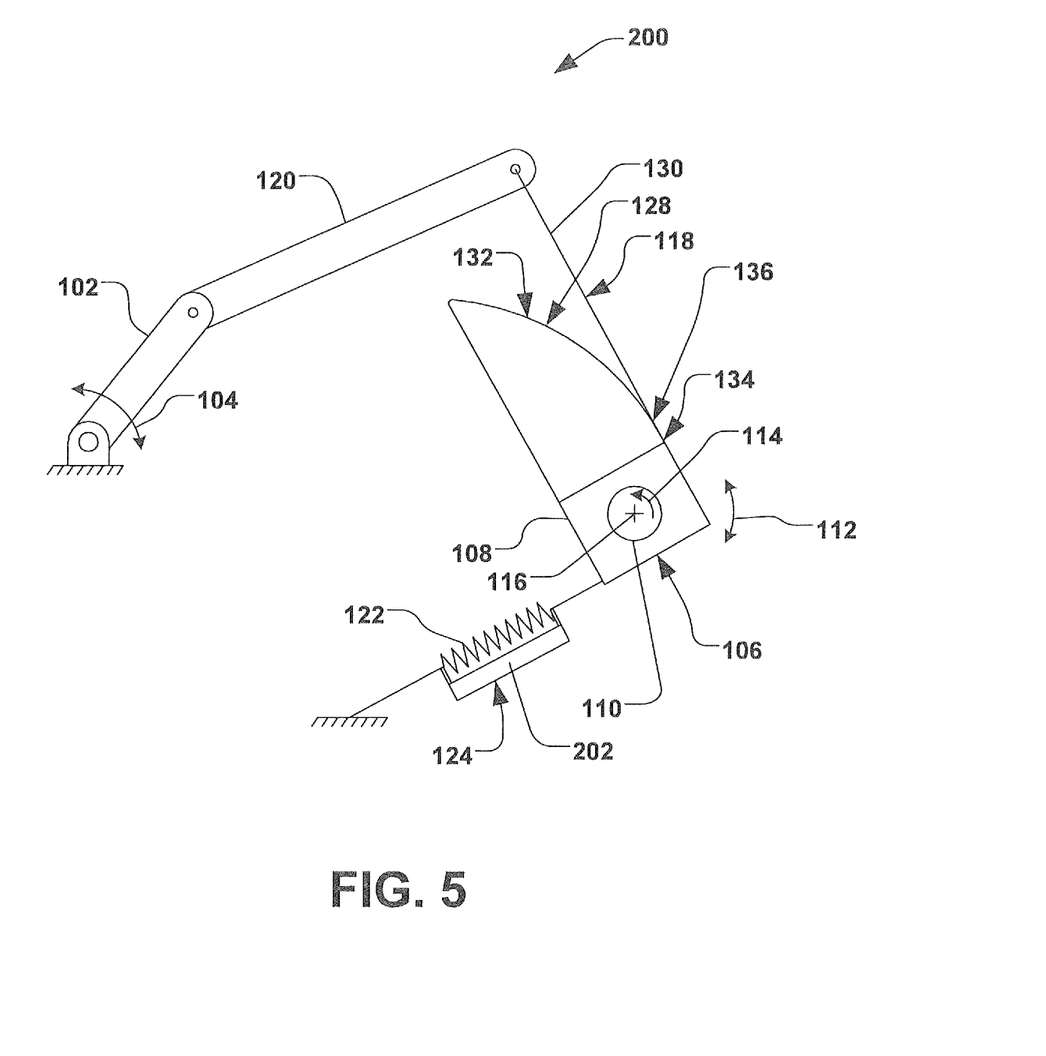
FIG. 5 is a schematic illustrating a continuously variable transmission in accordance with a further exemplary aspect of the disclosure.
Figure 6:
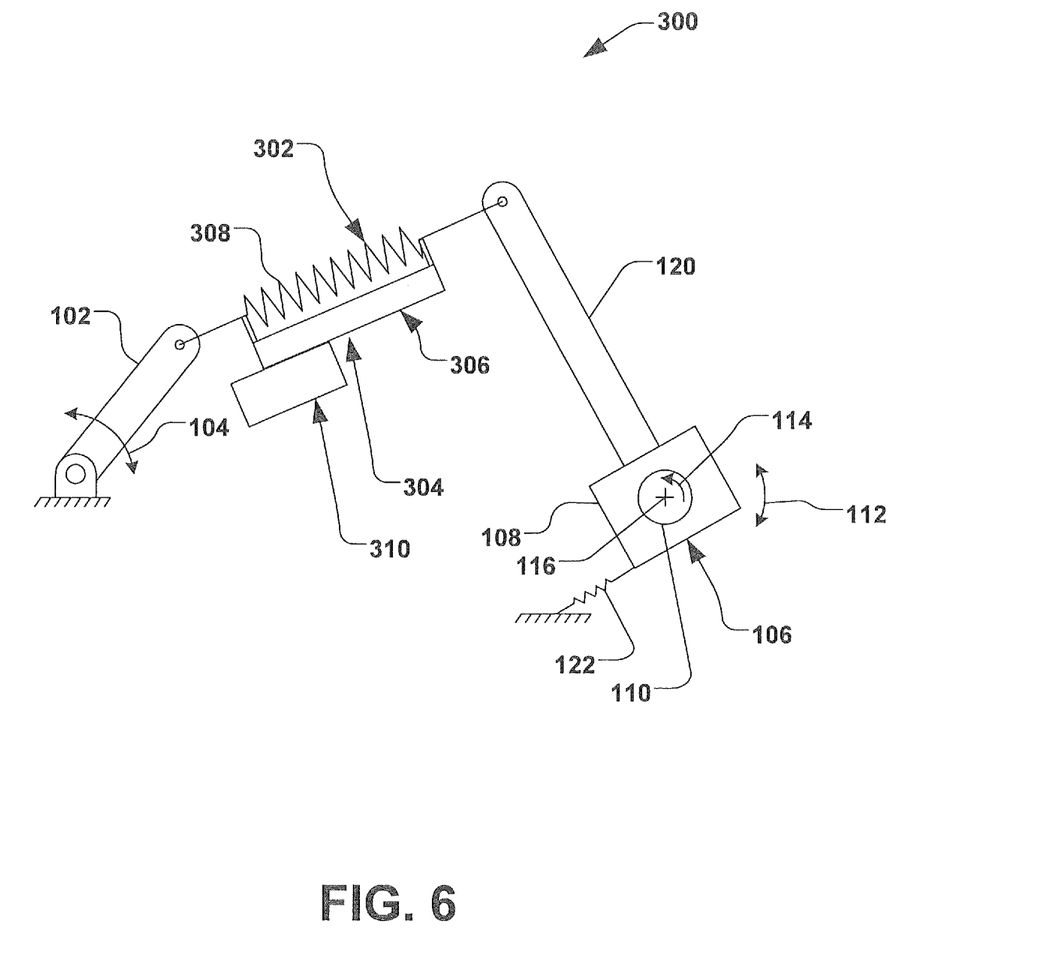
FIG. 6 is a schematic illustrating a continuously variable transmission having another exemplary speed control apparatus in accordance with another aspect of the disclosure.

It is noted that various examples of continuously varying transmission systems are described and set forth in the present disclosure. While the examples may vary in several manners, one commonality is that each CVT system is configured to vary a speed relationship between an input and output of the CVT system in a controlled manner. For example, as energy is put into the CVT system, the overall output speed (e.g., rotational speed of the output driven member 110) is varied in accordance with a torque demand. This variation is speed is accomplished, for example, by varying lengths of links in the CVT system using energy storage devices (e.g., springs). Specifically, in one example, a rocking or reciprocal motion is induced by the CVT, wherein an amplitude of the reciprocal motion is determined by a deflection of the aforementioned spring. The spring can take the form of a coil spring, beam spring, gas spring, or any other energy storage element. Thus, speed variation (and therefore torque multiplication) of the overall system is effectively changed automatically by a variation of the geometries involved. Accordingly, the speed of the output (e.g., rotational speed of the output driven member 110) can therefore be controlled by any means which can specify or enforce a specific behavior of the storage elements, such as a controlled variation of the spring constant of drive spring 118 in FIG. 1. Alternatively, as will be further described hereafter, similar behavior can be induced by pre-tensioning any spring element involved (e.g., as illustrated in FIG. 5), changing effective link lengths (e.g., as illustrated in FIGS. 4 and 6) or by simply changing the torque-displacement characteristics of the energy storage device (e.g., as illustrated in FIGS. 1,2,3,6 and 7).

Figure 2:
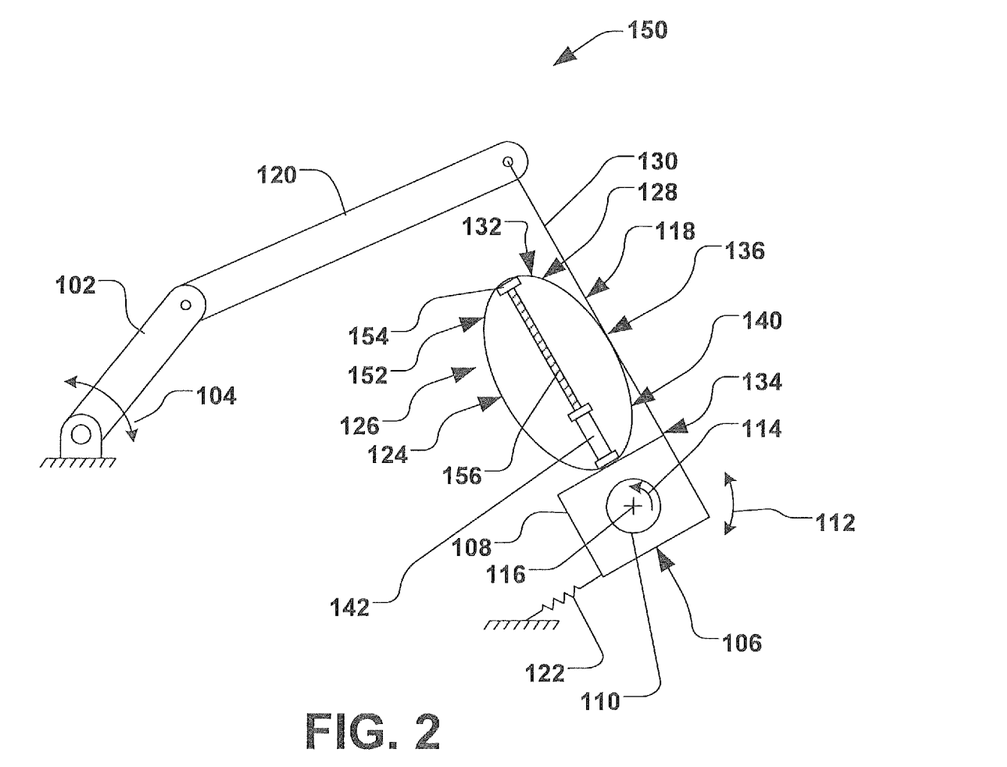
FIG. 2 is a schematic illustrating another continuously variable transmission in accordance with another exemplary aspect of the disclosure.

In accordance with another example, FIG. 2 illustrates another exemplary CVT system 150, wherein the backup wall 128 comprises a blade of material is in the form of a hoop 152. In a similar manner as described above, for example, the motor 142 of the control apparatus 124 is generally fixed with respect to the ratcheting member 108, wherein an another coupling 154 operably couples an output 156 (e.g., a rotating shaft) of the motor to the backup wall 128 (e.g., the hoop 152). The coupling 154, for example, comprises one or more of a cable and a screw operably coupled to the one or more of the motor 142 and backup wall 128. Accordingly, the motor 142 is configured to selectively deform the surface 132 (e.g., the selectively deformable surface 140) of the hoop 152 based on a rotation of the output 156 of the motor with respect to the coupling 154. Thus, the pre-tension associated with the drive spring 118 is again controlled, thus varying the deflection curve associated with the drive spring and affecting the rotational speed of the output driven member 110.

Figure 3:
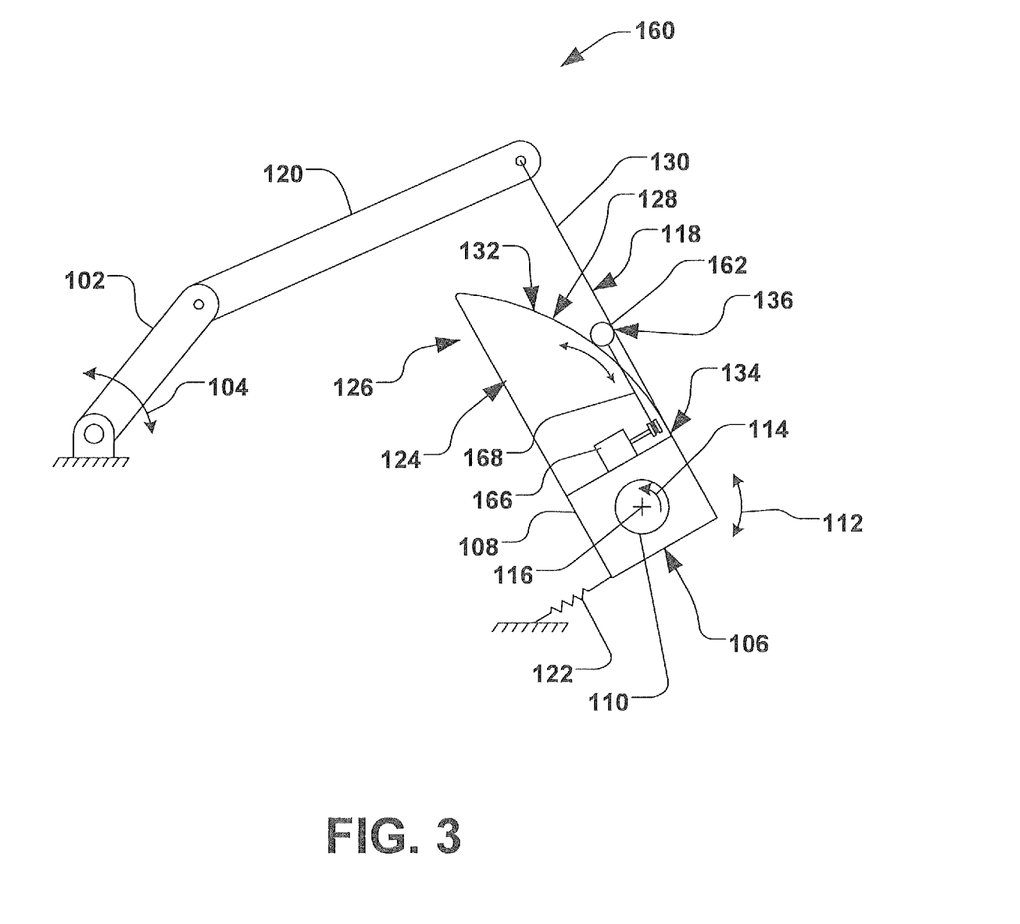
FIG. 3 is a schematic illustrating yet another continuously variable transmission in accordance with yet another exemplary aspect of the disclosure.

As illustrated in FIG. 3, another continuously variable transmission system 160 is shown, wherein the selectively adjustable member 126 comprises a plug member 162 configured to translate between the backup wall 128 and the cantilever spring 130 along the curved path (e.g., the surface 132) of the backup wall. The fulcrum 136 is thus defined as the point at which the cantilever spring 130 meets the plug member 162. Further, according to the present example, the control apparatus 124 is configured to vary a position of the plug member 162 along the curved path (e.g., along the surface 132 illustrated by arrow 164) of the backup wall 128, therein controlling the deflection curve associated with the cantilever spring 130. Again, in the present example, the pre-tension associated with the drive spring 118 is thus again controlled, thereby varying the deflection curve associated with the drive spring and affecting the rotational speed of the output driven member 110.

In the present example, the control apparatus 124 of the CVT system 160 of FIG. 3 further comprises one or more of a motor 166 and a cable 168 generally coupled to the plug member 162, wherein the one or more of the motor and cable is configured to translate the plug member along the curved path of the backup wall. In one alternative, a screw (not shown) is further or alternatively provided translate the plug member along the curved path of the backup wall. In the present example of FIG. 3, the return spring 122 maintains contact at the fulcrum 136 between the drive spring 118, the plug member 162, and the backup wall 128.

Referring now to FIG. 4, another exemplary CVT system 170 is illustrated, wherein the selectively adjustable member 126 comprises a slide 172 operably coupled to an end 174 of the drive linkage 120. The slide 172, for example, is configured to slidingly engage the cantilever spring 130 and translate along a length of the cantilever spring (e.g., illustrated by arrow 176). Accordingly, the engagement between of the slide 172 along the length of the cantilever spring 130 selectively varies an effective length of the cantilever spring, therein selectively varying the deflection curve associated with the drive spring. According to another example, the control apparatus 124 further comprises one or more of a motor 178 and a cable 180 generally coupled to the slide 172, wherein the one or more of the motor and cable is configured to translate the slide along the cantilever spring 130. In another alternative, a screw (not shown) is further or alternatively coupled to the slide 172 translate the slide along the cantilever spring 130.

In accordance with another exemplary aspect of the invention, another continuously variable transmission system 200 is illustrated in FIG. 5, wherein the control apparatus 124 comprises a return spring pre-tension apparatus 202. The return spring pre-tension apparatus 202, for example, controls a pre-tension associated with the return spring 122, therein selectively varying the deflection curve associated with the drive spring 118. The return spring pre-tension apparatus 202, for example, comprises one or more of a screw and a cable (not shown) configured to control a pre-tension associated with the return spring 122, therein selectively varying the deflection curve associated with the drive spring 118.

According to yet another exemplary aspect of the invention, another continuously variable transmission system 300 is illustrated in FIG. 6, wherein the drive linkage 120 is generally rigidly coupled to the ratcheting member 108. Accordingly, the drive force applied to the input driving member 102 (e.g., arrow 104) is transmitted to the drive linkage 120 via drive spring 302. The control apparatus 304, for example comprises a selectively adjustable member 306 in selective engagement with the drive spring 302, wherein the selectively adjustable member controls a pre-tension associated with the drive spring, therein selectively varying the deflection curve associated with the drive spring. The drive spring 302 in the present example comprises a coil spring 308, wherein the control apparatus 304 further comprises one or more of a motor, a screw, and a cable (not shown) generally coupled to the selectively adjustable member 306. One or more of a motor 310, screw, and cable (not shown) is thus configured vary a compression of the coil spring 308 via the selectively adjustable member 306.

Figure 7:
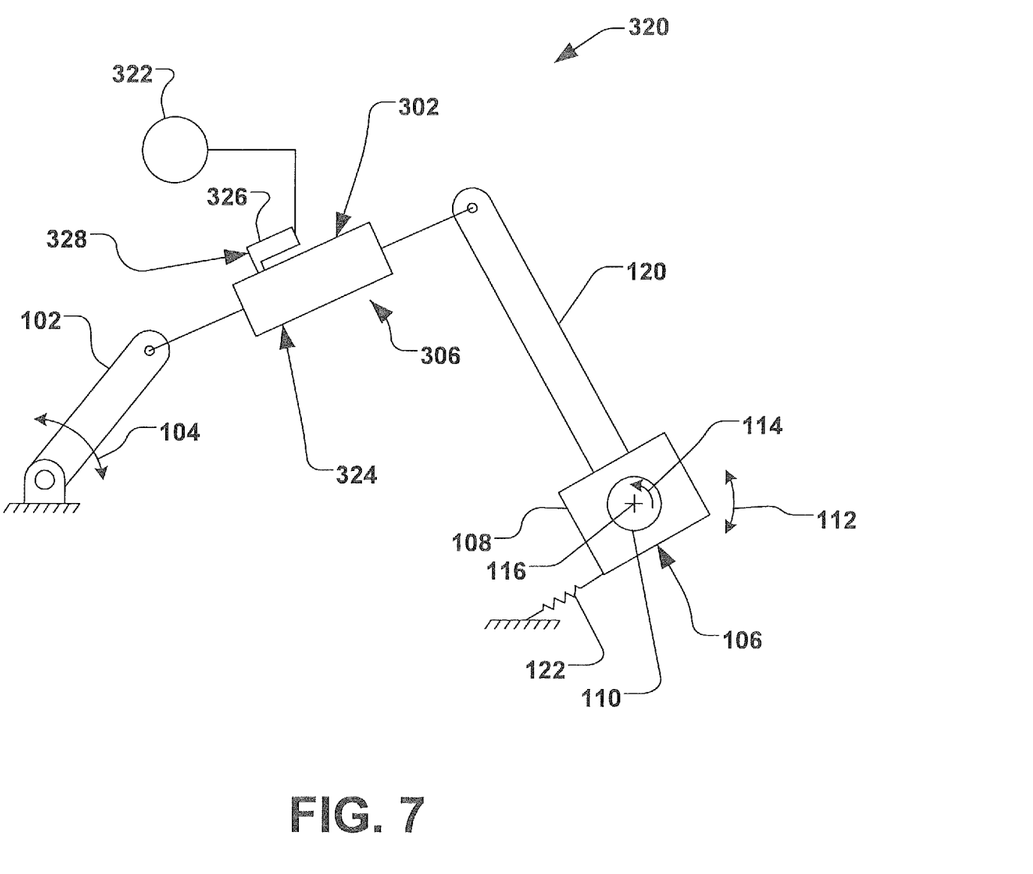
FIG. 7 is a schematic illustrating another exemplary continuously variable transmission in accordance with a further aspect of the disclosure.

Another exemplary continuously variable transmission system 320 is illustrated in FIG. 7, wherein the CVT system further comprises a gas source 322, wherein the drive spring 302 comprises a gas spring 324. Accordingly, the selectively adjustable member 306 comprises a pressure regulator 326 operably coupled between the gas source 322 and the gas spring 324. As such, the control apparatus 328 is configured to selectively vary a gas pressure within the gas spring 324 via a control of one or more of the pressure regulator 326 and gas source.

The present invention finds utility in a vast variety of applications. For example, the CVTs described above can be utilized in constant-cadence, constant-power, and/or constant-torque cycle ergometers/bicycles, wherein the CVT can be utilized as a torque limiter. Employing some of the control schemes previously described, the CVTs are operable to be utilized in a cycle ergometer, allowing for specific research or training in the area of human power production. Adjustability of the transmission allows for imperfections in the power-dissipating devices normally used on such equipment, and would lend itself to precise control over experiment or training conditions.

The present invention also finds utility in current control in electrical generators, wherein the ability of the CVT to control speed output over a continuum is sufficient to permit a current draw control scheme that could be applied to almost any electricity generator. As an example, combining the transmission with a wind generator would allow variation of the current draw on the generator, such that an optimal torque relationship could be achieved. Conversely, a different control scheme could be employed to achieve voltage control by controlling the speed of the generator instead of the torque. Alternatively, the transmission can be employed as a variable-speed drive for nearly any application, such as industrial pumps and fans.

Another utility is a manually-powered (or, alternatively, electricity-powered) winch for various applications. One exemplary implementation of the CVT of the present invention is a portable, lightweight, extreme-duty winch. The winch, for example, can be hand powered or powered by a small electric motor. Such a winch could be used for emergency situations (e.g., turning over a car or opening a stuck door), or even to operate human-powered farm equipment such as a plow.

Alternative uses are a linear-rotary motion converter, wherein by using a cantilever beam connected to the ratchet, linear motion can efficiently be converted to rotary motion. One example would be the direct connection of the piston of a free-piston stirling engine to a cantilever beam spring. The spring driving a ratchet would permit the stirling engine to turn a rotary shaft without shaking forces on the cylinder walls, while allowing continuous variation of the speed or torque output of the engine.

The CVT of the present invention can also be employed as a torque limiter. By adjusting the drive spring behavior, a maximum torque load can be applied to any input or output. Thus, the CVT could be used as a safety device on a drive, which would be easier to reset or fix than a shear pin or keyway. This concept could also be used to increase tool life on machine/cutting tools by limiting the torque allowed to be exerted on the tool's blades.

Another exemplary utilization of the CVT of the present invention includes the ability of the transmission to speed up output over the input. This could be done by using cables to drive pulleys such that one stroke or rotation of the input could turn the output more than one revolution.

It should be noted that while exemplary methods are illustrated and/or described herein as not limited by the illustrated ordering of such acts or events, as some steps may occur in different orders and/or concurrently with other steps apart from that shown and described herein, in accordance with the invention. In addition, not all illustrated steps may be required to implement a methodology in accordance with the present invention. Moreover, it will be appreciated that the methods may be implemented in association with the systems illustrated and described herein as well as in association with a series of acts or events, it will be appreciated that the present invention is other systems not illustrated.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application.

What is claimed is:

1. A continuously variable transmission system, comprising:
    an input driving member which is drivable in alternating motion by a source of input mechanical energy;
    a ratchet comprising a ratcheting member and an output driven member, wherein the ratcheting member is configured to alternate directions of motion and to rotationally drive the output driven member in a continuous rotational direction about a driven axis;
    a drive spring and a drive linkage drivingly linked between the input driving member and the ratcheting member, wherein a drive force applied to the input driving member is transmitted to the ratcheting member via the drive spring and drive linkage;
    a return spring drivingly linked to the ratcheting member, wherein the return spring is configured to apply a return force to the ratcheting member, wherein the return force is in a direction generally opposite to the drive force applied by the drive spring and drive linkage;
    a backup wall interacting with the drive spring; and,
    a control apparatus configured to selectively vary a deflection curve associated with the drive spring, wherein the variation in the deflection curve generally determines one or more of a rotational speed and torque associated with the output driven member, wherein the control apparatus further comprises a motor generally fixed with respect to the ratcheting member, said motor having a rotational output, and a coupling that operably couples said output of the motor to at least one of the backup wall and drive spring, wherein a spring constant of said drive spring may be adjusted based on a rotation of the output of the motor with respect to the coupling, said motor having an output shaft driven by said rotational output, a length of said output shaft being continuously variable and having an output end bearing against said backup wall whereby to continuously adjust said deflection curve.

2. The continuously variable transmission system of claim 1 wherein the backup wall includes a deformable surface and said output of the motor is coupled to the backup wall to selectively deform said surface thereby altering a point of contact between said drive spring and said backup wall.

3. The continuously variable transmission system of claim 1 wherein the drive spring comprises a cantilever spring coupled between the drive linkage and the ratcheting member, wherein a surface of the backup wall extends along a curved path from near a place of coupling of the cantilever spring to the ratcheting member, and wherein the surface of the backup wall generally defines a fulcrum of the cantilever spring based on a rotational position of the ratcheting member.

4. The continuously variable transmission system of claim 3, wherein the backup wall comprises a selectively deformable surface, wherein the fulcrum of the cantilever spring is generally defined by a point at which the cantilever spring meets the selectively deformable surface.

5. The continuously variable transmission system of claim 4, wherein the backup wall comprises a blade of material that defines the selectively deformable surface.

* * * * *